US012717928B2

(12) United States Patent
Iyengar et al.

(10) Patent No.: US 12,717,928 B2
(45) Date of Patent: Aug. 25, 2026

(54) AUTOMATIC CONSTRUCTION OF ATTACK GRAPHS USING LARGE LANGUAGE MODELS

(71) Applicant: Cisco Technology, Inc., San Jose, CA (US)

(72) Inventors: Arun Kwangil Iyengar, Yorktown Heights, NY (US); Ashish Kundu, Milpitas, CA (US); Renascence Tarafder Prapty, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 18/792,741

(22) Filed: Aug. 2, 2024

(65) Prior Publication Data

US 2026/0037638 A1 Feb. 5, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
See application file for complete search history.

(56) References Cited

U.S. PATENT DOCUMENTS 11,729,198 B2 * 8/2023 Kuppa ................ H04L 63/1433 726/25
12,368,745 B1 * 7/2025 Guo .................... G06F 16/9024
2014/0165195 A1 * 6/2014 Brdiczka ............... G06F 21/552 726/23
2017/0279838 A1 * 9/2017 Dasgupta ............ H04L 63/1425

(Continued)

FOREIGN PATENT DOCUMENTS

CN 111639344 A * 9/2020 ............. G06N 3/045
CN 115099388 A * 9/2022 ............... G06N 3/08

(Continued)

OTHER PUBLICATIONS

M. Omar and S. Shiaeles, "VulDetect: A novel technique for detecting software vulnerabilities using Language Models, " 2023 IEEE International Conference on Cyber Security and Resilience (CSR), Venice, Italy, 2023, pp. 105-110, (Year: 2023).*

(Continued)

*Primary Examiner* — Sher A Khan
(74) *Attorney, Agent, or Firm* — Lee & Hayes, P.C.

(57) ABSTRACT

In one embodiment, a method for automatic construction of attack graphs using large language models includes sending, by a computing system comprising one or more processors configured to execute one or more processes, vulnerability information to at least one large language model in order to extract structured information and building, by the computing system comprising the one or more processors configured to execute the one or more processes, a natural language query based on the structured information. The method further comprises sending, by the computing system comprising the one or more processors configured to execute the one or more processes, the natural language query to the at least one large language model to generate at least a portion of an attack graph from the vulnerability information.

20 Claims, 7 Drawing Sheets

(56) References Cited

U.S. PATENT DOCUMENTS

| | | | | |
|---|---|---|---|---|
| 2017/0286690 | A1* | 10/2017 | Chari | H04L 63/1433 |
| 2018/0191751 | A1* | 7/2018 | El-Moussa | G06F 16/9024 |
| 2018/0211047 | A1 | 7/2018 | Olson et al. | |
| 2019/0318085 | A1* | 10/2019 | Mathur | G06F 21/55 |
| 2021/0014263 | A1 | 1/2021 | Soroush et al. | |
| 2022/0014534 | A1* | 1/2022 | Basovskiy | H04L 63/1433 |
| 2022/0046046 | A1* | 2/2022 | Rao | H04L 63/20 |
| 2022/0179964 | A1* | 6/2022 | Qiao | G06F 21/577 |
| 2023/0336581 | A1 | 10/2023 | Dunn et al. | |
| 2023/0370486 | A1* | 11/2023 | Paquette | H04L 63/1433 |
| 2023/0412635 | A1* | 12/2023 | Binyamini | G06N 5/04 |
| 2024/0244068 | A1* | 7/2024 | Crabtree | H04L 63/1433 |
| 2024/0411994 | A1* | 12/2024 | Siracusano | G06F 40/205 |
| 2024/0414190 | A1* | 12/2024 | Lal | G06F 40/58 |
| 2025/0036777 | A1* | 1/2025 | Cameron | G06F 21/577 |
| 2025/0077509 | A1* | 3/2025 | Schindel | G06F 16/212 |
| 2025/0148084 | A1* | 5/2025 | Foulon | G06F 21/577 |
| 2025/0190802 | A1* | 6/2025 | Kar | G06N 3/0895 |
| 2025/0217634 | A1* | 7/2025 | Bono | G06N 3/08 |
| 2025/0217638 | A1* | 7/2025 | Lin | G06N 3/08 |
| 2025/0284683 | A1* | 9/2025 | Modelo-Howard | G06F 16/243 |
| 2025/0342191 | A1* | 11/2025 | Noel | G06F 16/353 |
| 2026/0017378 | A1* | 1/2026 | Neupane | G06F 21/577 |

FOREIGN PATENT DOCUMENTS

| | | | | | |
|---|---|---|---|---|---|
| CN | 115455206 | A | * | 12/2022 | G06F 16/367 |
| CN | 117494131 | A | * | 2/2024 | G06F 21/577 |
| CN | 118484806 | A | * | 8/2024 | |
| EP | 3821359 | B1 | * | 5/2025 | G06N 7/01 |
| KR | 20250154899 | A | * | 6/2023 | G06F 40/30 704/9 |
| KR | 20250153633 | A | * | 10/2025 | H04L 63/20 |
| WO | WO-2023248356 | A1 | * | 12/2023 | H04L 63/1433 |

OTHER PUBLICATIONS

Bezawada B., et al., "AGBuilder: An AI Tool for Automated Attack Graph Building, Analysis, and Refinement", Hal Open Science, Submitted on Nov. 28, 2019, retrieved from https://inria.hal.science/hal-02384601, pp. 1-20.

Al Ghazo A., et al., "A2G2V: Automatic Attack Graph Generation and Visualization and Its Applications to Computer and SCADA Networks", IEEE Transactions on Systems, Man, and Cybernetics: Systems, vol. 50, No. 10, 2019, pp. 3488-3498.

GitHub: "CVEProject/cvelistV5: CVE Cache of the Official CVE List in CVE JSON 5 Format", GitHub, Retrieved from: https://github.com/CVEProject/cvelistV5, Retrieved on Mar. 12, 2026, 6 Pages.

Jin X., et al., "Prometheus: Infrastructure Security Posture Analysis with AI-generated Attack Graphs", Arxiv preprint: arXiv:2312.13119v1 [cs.CR], Dec. 20, 2023, 18 Pages.

Ou X., et al., "A Scalable Approach to Attack Graph Generation", Proceedings of the 13th ACM Conference on Computer and Communications Security, Oct. 2006, pp. 336-345.

Payne J., et al., "How Secure Is Your IoT Network", IEEE International Congress on Internet of Things (ICIOT), Arxiv:1912.12373v1 [cs.CR], Dec. 28, 2019, pp. 181-188.

Sheyner O., et al., "Automated Generation and Analysis of Attack Graphs", Proceedings of the 2002 IEEE Symposium on Security and Privacy, 2002, pp. 273-284.

* cited by examiner

AUTOMATIC CONSTRUCTION OF ATTACK GRAPHS USING LARGE LANGUAGE MODELS

TECHNICAL FIELD

The present disclosure relates generally to computer networks, and, more particularly, to the automatic construction of attack graphs using large language models.

BACKGROUND

Attack graphs are a key component in computer security. An attack graph is a general formalism used to model security vulnerabilities of a computer system and all possible sequences of exploits which an intruder can use to achieve a specific goal. Many computer systems make significant use of attack graphs and attack path analysis in order to enhance computer security.

However, attack graphs can be difficult to accurately construct, particularly as the complexity of computer systems increases. One reason for this is that it can be difficult to analyze the sheer volume of information that may be required to construct an attack graph (e.g., the security vulnerabilities of a computer system and all possible sequences of exploits which an intruder can use to achieve a specific goal). As a result, some attack graphs may be suboptimal.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, a method for automatic construction of attack graphs using large language models includes sending, by a computing system comprising one or more processors configured to execute one or more processes, vulnerability information to at least one large language model in order to extract structured information and building, by the computing system comprising the one or more processors configured to execute the one or more processes, a natural language query based on the structured information. The method further comprises sending, by the computing system comprising the one or more processors configured to execute the one or more processes, the natural language query to the at least one large language model to generate at least a portion of an attack graph from the vulnerability information.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computing system.
Figure 1:
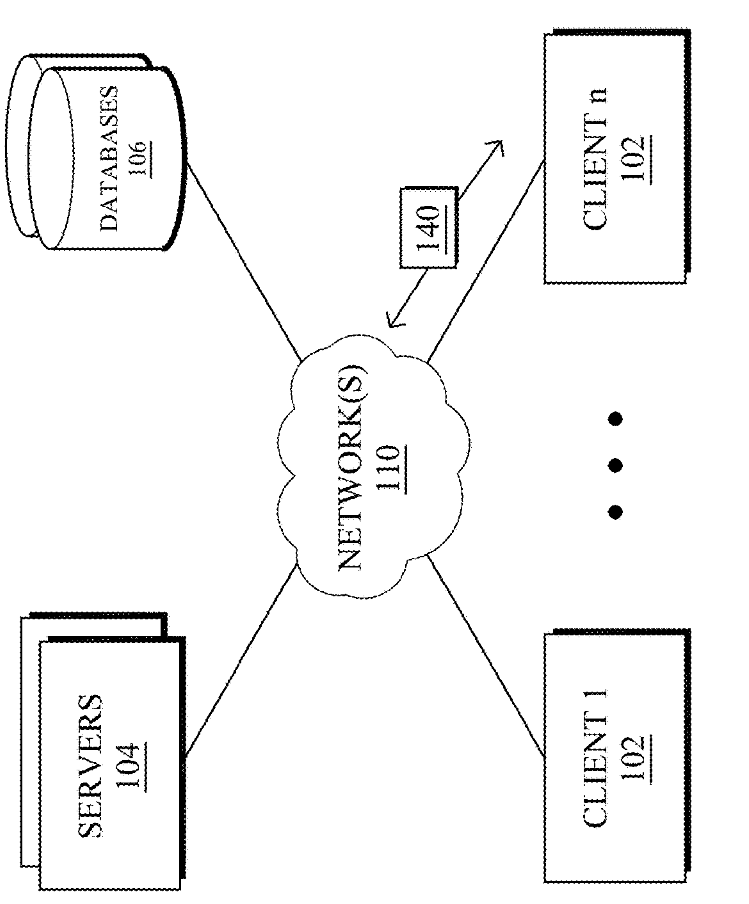

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IOT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
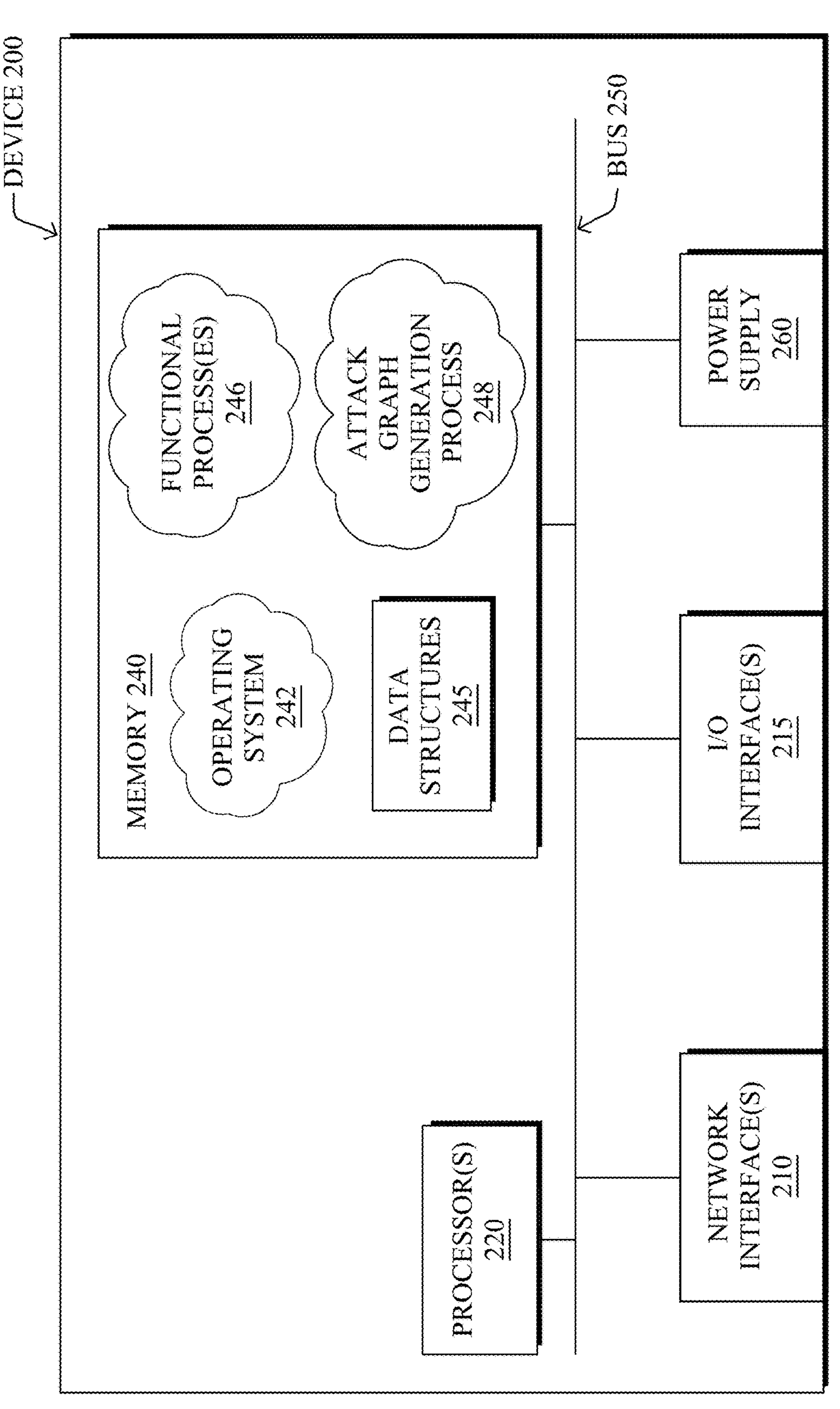
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, an attack graph generation process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, one or more functional processes 246 and/or attack graph generation process (process 248) may include computer executable instructions that, when executed by processor(s) 220, cause device 200 to perform the techniques described herein. To do so, in some implementations, one or more functional processes 246 and/or process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, one or more functional processes 246 and/or process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that one or more functional processes 246 and/or process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, one or more functional processes 246 and/or process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, one or more functional processes 246 and/or process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, one or more functional processes 246 and/or process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

——Automatic Construction of Attack Graphs Using Large Language Models——

As noted above, attack graphs are a key component in computer security. However, a key issue with attack graphs is that they are difficult to construct accurately. Analyzing all of the information is difficult, and existing techniques to do so result in suboptimal graph construction.

Stated alternatively, the complexity of modern computing systems has made it essential to assess the security posture of such computing systems through vulnerability management and threat modeling techniques, such as attack graphs. Accordingly, attack graphs are important tools for security analysts as they provide a comprehensive view of multiple attack vectors that could compromise system security. However, constructing attack graphs has traditionally been a manual and time-consuming process that requires extensive expertise in cybersecurity. Although some automated techniques exist for the generation of attack graphs, these approaches often rely on static rules or heuristics that are not scalable for the ever-changing landscape of vulnerabilities and threats presented to real world computing systems.

For example, some approaches rely on static formal definitions and/or model checking algorithms to generate attack graphs. However, these methods are generally domain-specific and therefore cannot be applied to emerging attack vectors. Furthermore, such approaches may require manual input of vulnerability information, which is less than desirable, particularly given the fact that new vulnerabilities are continually being discovered. These shortcomings can lead to suboptimal attack graph generation because attack graphs that are not updated promptly with the newest and most current vulnerability information may not be able to provide enough useful information.

Further, current approaches to attack graph generation do not generally take advantage of the advanced natural language processing (NLP) features offered by large language models and do not enhance LLM analysis with structured data analysis.

The techniques herein, therefore, provide automated methods of analyzing security vulnerabilities and generating attack graphs using a combination of large language models and structured information (e.g., in a datastore, such as a relational databases) in order to generate up-to-date attack graphs that are scalable with the overall size of a computing system of which the attack graph represents.

Specifically, according to one or more embodiments of the disclosure as described in detail below, a method for automatic construction of attack graphs using large language models includes sending, by a computing system comprising one or more processors configured to execute one or more processes, vulnerability information to at least one large language model in order to extract structured information and building, by the computing system comprising the one or more processors configured to execute the one or more processes, a natural language query based on the structured information. The method further comprises sending, by the computing system comprising the one or more processors configured to execute the one or more processes, the natural language query to the at least one large language model to generate at least a portion of an attack graph from the vulnerability information.

In particular, in accordance with the disclosure, techniques for automatic attack graph generation involving NLP techniques and machine learning models are described herein. These methodologies can use NLP to extract different properties from vulnerability information found in a public database called the Common Vulnerabilities and Exposures (CVE). The extracted properties are then utilized to create attack paths by chaining different CVEs. However, traditional machine learning models require an extensive training phase, which is a non-trivial task.

To address this limitation, implementations herein leverage the benefit of large language models (LLMs) for the targeted task. Large language models, such as GPT-4, have demonstrated significant capabilities in natural language understanding and generation. As discussed in more detail herein, implementations of the present disclosure provide for automated attack graph generation using retriever-augmented large language models. To achieve this, a new retriever model is disclosed for the correct and precise extraction of relevant CVEs based on system information.

For example, a retriever-augmented LLM to automatically generate attack graphs is disclosed herein. This design can allow users to create an attack graph by inputting the names of the components in their system (e.g., computing system). As will be appreciated, a typical system is made up of multiple hardware and/or software components. The retriever may be used to obtain CVEs related to the user's input. These CVEs are then used to provide context for the LLM prompt, which in turn generates the attack graph.

The retriever discussed herein is an improved search model that can perform precise semantic searches in a structured database. Current retriever models are not adequate for such tasks because they generally rely on either keyword matching or cosine similarity between embeddings from the entire CVE description and the user's query to find relevant CVEs. As will be appreciated, keyword matching only considers syntactical closeness and disregards semantic similarity entirely. Meanwhile, semantic matching using embeddings of the whole CVE description results in low cosine similarity between the CVE embedding and query embedding. However, it has been observed that cosine similarity is inversely proportional to the length of the CVE description. Therefore, by keeping the cosine similarity threshold high for a CVE to be considered relevant, it is possible to miss related CVEs with long descriptions. Conversely, selecting a low cosine similarity threshold can result in extracting CVEs that are not actually related.

Another issue with current approaches is the level of granularity of the selection criteria. Some vulnerabilities may only affect products of a specific platform, such as a product that only runs on Linux and not on Windows. The same is true for version numbers. That is, in some cases, only specific versions of the product may be vulnerable. Additionally, the user may only be interested in specific types of vulnerabilities, such as buffer overflow or remote code execution, etc. Neither keyword search nor embedding from the whole description facilitates these fine-tuned retrievals.

In contrast, the retriever model described herein solves these problems by incorporating both relational database and NLP techniques in the design of the retriever. The motivation for this is the semi-structured nature of a CVE. The most crucial part of a CVE is the natural language description of the vulnerability. However, the description text always contains certain properties, such as associated product name, affected platform, and version numbers, etc. Accordingly, in accordance with the disclosure, NLP techniques handle extracting and semantically matching necessary properties from the natural language description of a CVE, while the relational database takes advantage of the structured part and stores different properties and associated metadata. These NLP techniques are implemented through the use of LLMs.

Although examples herein are generally discussed in terms of utilizing a single LLM for construction of attack graphs, implementations are not so limited and various other techniques are contemplated within the scope of the disclosure. For example, attack graph generation in accordance with the disclosure can be carried out by sending requests to multiple LLMs either in parallel or in series. In such implementations, the LLMs can be multiple versions of a same LLM or can be entirely different LLMs. Further, implementations described herein also contemplate sending multiple parallel requests to a single LLM as part of constructing the attack graphs described herein.

In these scenarios, a single request can be used to construct part of an attack graph (e.g., "attack subgraph"). In some implementations then, multiple requests can then be used to construct a full attack graph. That is, in some implementations, a full attack graph is constructed from a plurality of subgraphs, where the subgraphs are constructed based on requests sent to multiple LLMs either in parallel or in series, or the subgraphs are constructed based on multiple serial or parallel requests sent to a single LLM. Our system can assemble a full attack graph from multiple subgraphs provided by one or more LLMs.

Figure 3:
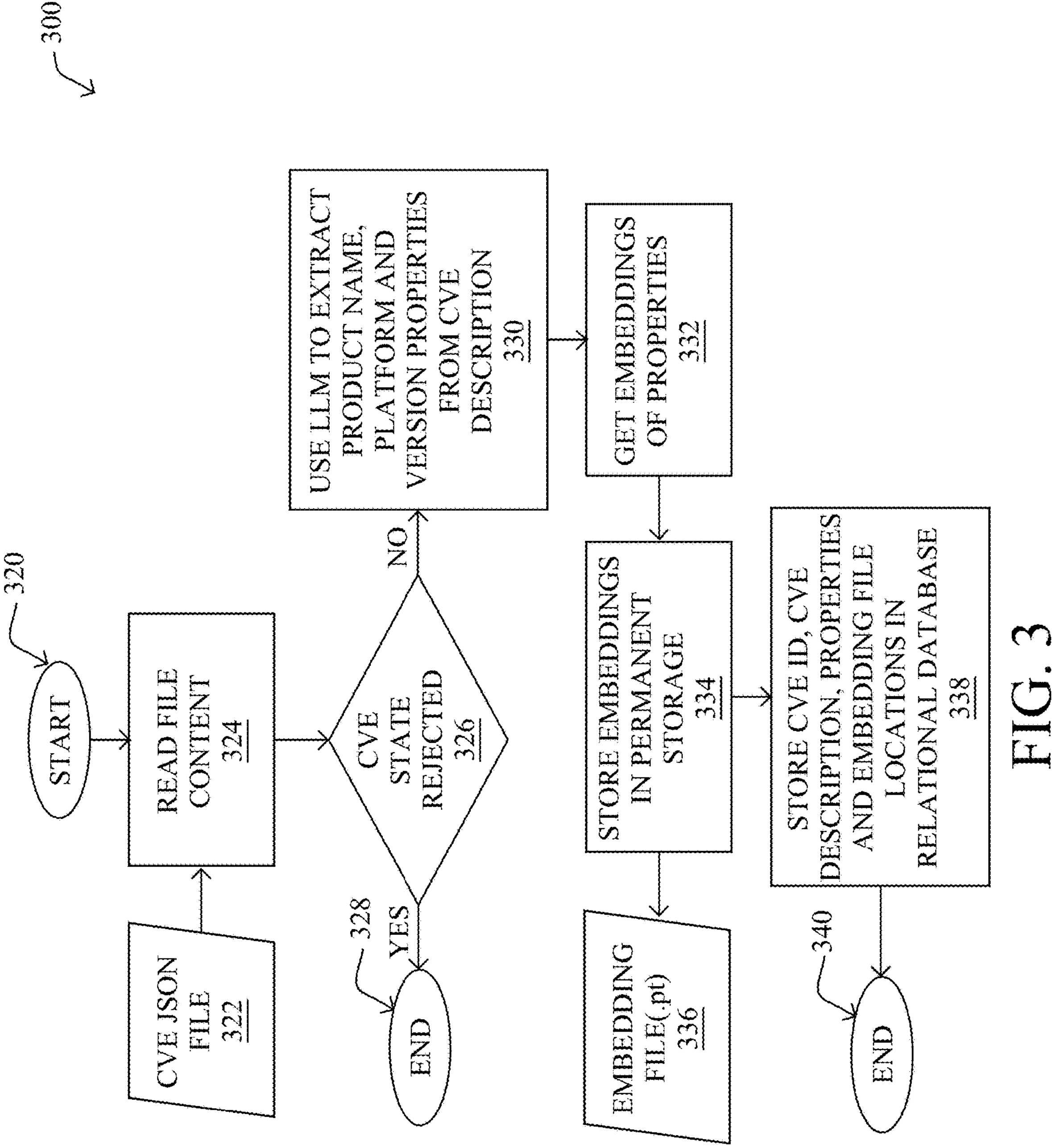
FIG. 3 illustrates an example flow for preprocessing data for the automatic construction of attack graphs using large language models in accordance with the disclosure.

Operationally, FIG. 3 illustrates an example flow 300 for preprocessing data for the automatic construction of attack graphs using large language models in accordance with the disclosure. As discussed in more detail, herein, FIG. 3 utilizes an LLM instead of traditional machine learning models for extracting relevant properties for the automatic construction of attack graphs. At the outset it is noted that the operations performed during the flow 300 represent the preprocessing of a single CVE JavaScript Object Notation (JSON) file, CVE JSON file 322, from a database (e.g., a public CVE database). Accordingly, in some implementations, the whole process (e.g., the flow 300) may be repeated for each CVE JSON file 322 in order to access all relevant CVE JSON files for automatic construction of attack graphs using large language models in accordance with the disclosure.

At operation 320, the flow 300 begins. As mentioned above, each published CVE is available as an individual JSON file (e.g., a CVE JSON file 322) in a CVE public database. At operation 324, an application (e.g., a Python program, etc.) may read the CVE JSON file 322 and create a JSON object from the CVE JSON file 322. As will be appreciated, the state property of the JSON object may denote whether the CVE was rejected by the MITRE corporation, the organization which maintains the CVE database.

At operation 326, a determination can be made as to whether the state property of the JSON object created at operation 324 is rejected or not. If the JSON object is rejected (e.g., the JSON object was rejected by the MITRE corporation), the flow 300 ends at operation 328. By thus rejecting a JSON object corresponding to a rejected CVE JSON file (a CVE JSON file 322), a reduction in CVE JSON files that are fully processed through the flow 300 may be reduced, thereby reducing computing resources and/or time in preprocessing data for the automatic construction of attack graphs using large language models.

It is now noted that the CVE JSON objects (e.g., a JSON object created at operation 324) can contain a description property, which can provide a natural language description of a vulnerability. Next, at operation 330, various properties can be obtained from the description properties of the CVE JSON objects. In the example of FIG. 3, three properties, namely Product Name, Platform, and Affected Versions are obtained from the description properties of the CVE JSON objects by using an LLM. For example, a prompt (e.g., a query) that includes the CVE description can be sent to an LLM along with an instruction to the LLM to extract the above-mentioned properties from the description. In some implementations, the LLM may also be asked to send back the response in a specific JSON format. In this manner, the obtained values of the properties can be provided in a natural language format.

At operation 332, embeddings of the obtained values of the properties from operation 330 are calculated. For example, at operation 332, the embedding of Product Name and Platform property values may be calculated using a retriever trained with contrastive learning (a "contrastive retriever"), such as the known Contriever model. This can facilitate performance of a semantic search of the information contained in the embeddings at a later operation.

These embeddings are then saved at operation 334. In some implementations, the embeddings may be saved to persistent storage, although implementations are not so limited and other storage mechanisms (e.g., cloud storage, etc.) may be employed within the scope of the disclosure. As shown in FIG. 3, the embeddings can be saved as a .pt file 336 in a hard disk or cloud storage system using, for example, the PyTorch save method. Implementations are not limited to this save method, however, and other save mechanisms may be utilized without departing from the scope of the disclosure.

At operation 338, a CVE ID, which is the unique identifier of a CVE, as well as a natural language CVE description can be saved as a record in database table (e.g., a CVE_INFO database table). In some implementations, the natural language value of the Product Name property, the corresponding embedding file (e.g., the .pt file 336) location and the CVE_ID can constitute another record and can be in a different table (e.g., a PRODUCT_INFO table).

In accordance with the disclosure, the CVE_ID can operate as a foreign key. In addition, each record in the PRODUCT_INFO table can get an auto generated unique identifier called, for example, "PRODUCT_ID." Similarly, the natural language value of the Platform property, the corresponding embedding file (e.g., the .pt file 336) location, and the CVE_ID (now as a foreign key) can be saved as a record in yet another table (e.g., a PLATFORM table). Finally, the version number, associated qualifier (e.g., "all versions greater than x," etc.) and corresponding PRODUCT_ID can be stored in yet another table (e.g., a VERSION_INFO table). In this case, the PRODUCT_ID can operate as the foreign key.

At operation 340, the flow 300 ends.

Figure 4A:
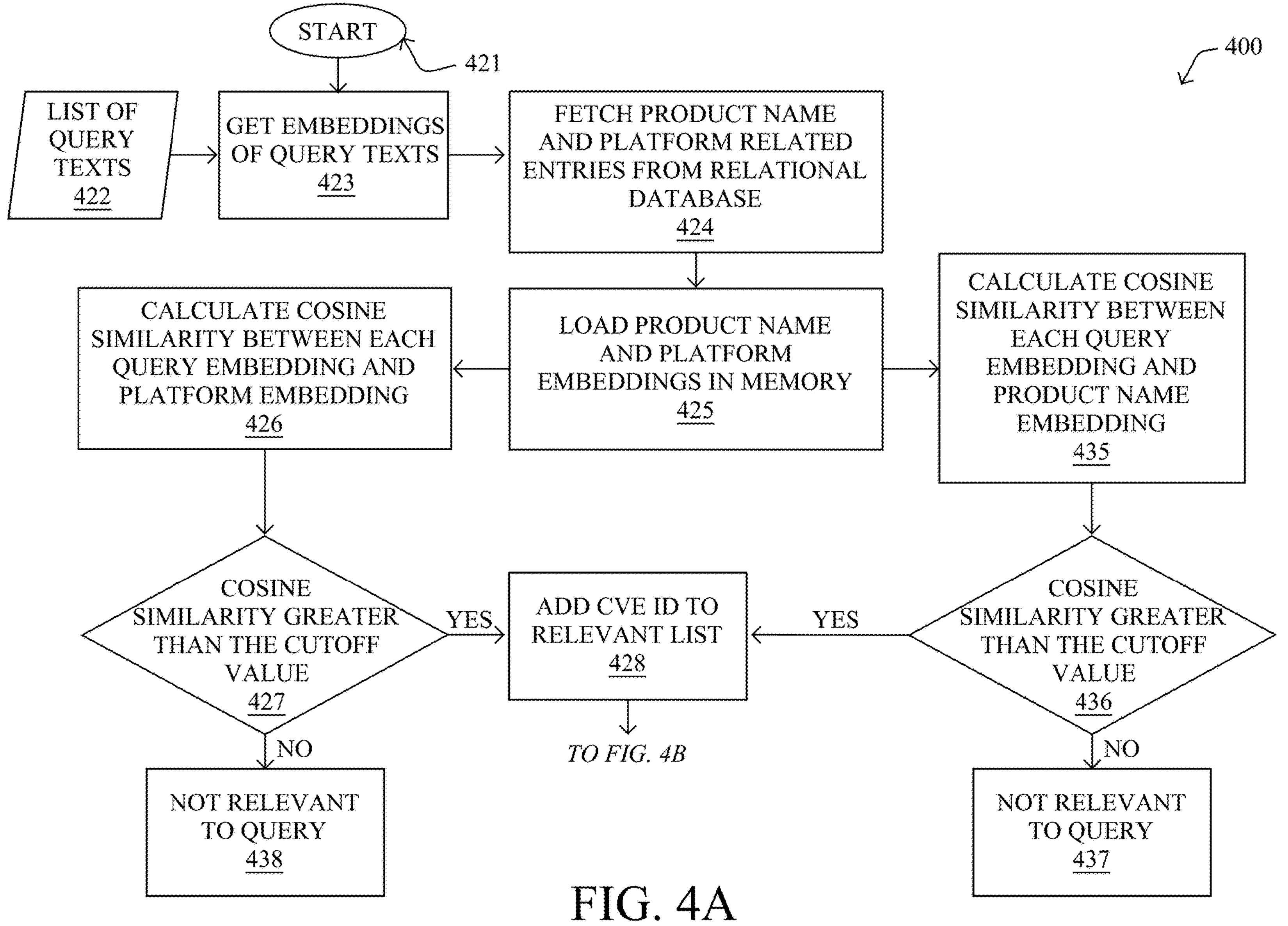
FIGS. 4A-4B illustrate an example flow for generating an attack graph in accordance with the disclosure.
Figure 4B:
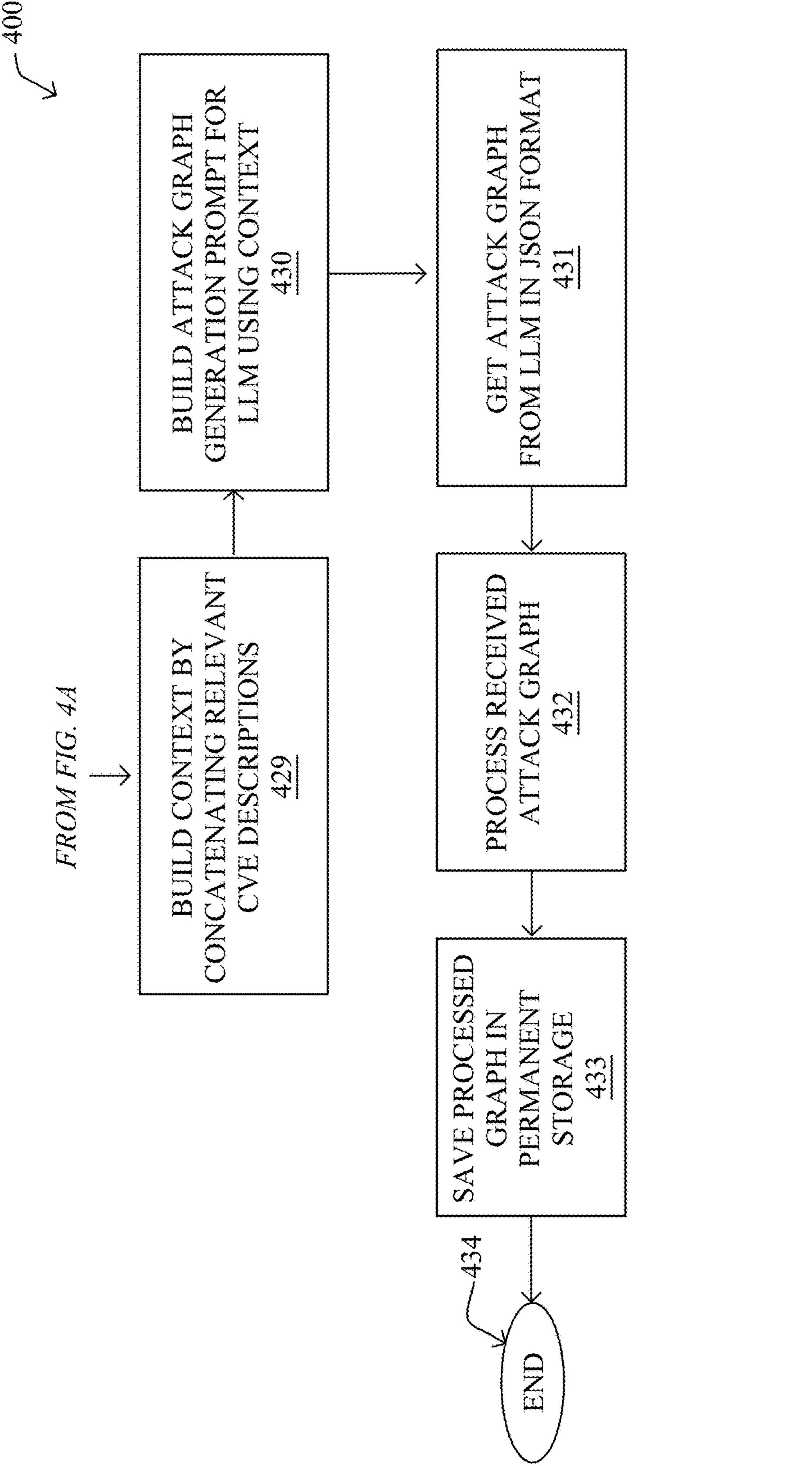

FIGS. 4A-4B illustrate an example flow 400 for generating an attack graph in accordance with the disclosure. The flow 400 details the process of fine-tuned semantic searching using relational database and NLP techniques, as well as implementations relating to the creation of attack graphs using the retriever augmented LLM techniques disclosed herein. At operation 421, the flow 400 begins. At operation 422, a user who wants to generate an attack graph of a system provides the names of all components (e.g., Product Names of component of the system, etc.) as a list of query texts. At operation 423, embeddings of all query texts are obtained using a Contriever model, similar to what was described above in connection with FIG. 3.

At operation 424, records from the PRODUCT_INFO table and PLATFORM_INFO table (described above in connection with FIG. 3) can be retrieved (e.g., fetched). As discussed above, each record contains the location of the corresponding embedding file (e.g., the .pt file 336) discussed in connection with FIG. 3, herein. At operation 425, Product Name embeddings and/or Platform embeddings can be loaded in memory using the file locations from the records. In some implementations, this information can be retrieved from the storage locations discussed at operation 334 and/or operation 338 in connection with FIG. 3, above.

Continuing with the example of FIG. 4A, at operation 426, cosine similarity between each query text embedding and platform embedding can be calculated. It is noted that cosine similarities may be calculated for all platform records and all query texts (e.g., all component names of the whole system for which the attack graph will be generated). Next, at operation 427, a determination is made as to whether a CVE associated with the particular platform record represents a vulnerability of one of the components of the system. In some implementations, this determination can be made based on whether the cosine similarity meets one or more criterion (e.g., exceeds or fails to exceed a particular cosine similarity threshold or "cutoff"). If the cosine similarity at operation 427 is determined to fail to meet such a criteria or criterion, at operation 438 the CVE is determined to not be relevant to the query at hand.

At operation 435, the cosine similarity between each query text embedding and product name embedding can be calculated. Similar to operation 427, at operation 435, cosine similarities are calculated for all product name records and all query texts (e.g., all component names of the whole system for which the attack graph will be generated). Next, at operation 436 a determination can be made as to whether the CVE associated with the particular product name record represents a vulnerability of one of the components of the system. In some implementations, this determination can be made based on whether the cosine similarity meets one or more criterion (e.g., exceeds or fails to exceed a particular cosine similarity threshold or "cutoff"). If the cosine similarity at operation 427 is determined to fail to meet such a criteria or criterion, at operation 437 the CVE is determined to not be relevant to the query at hand.

If, at operation 427 and/or operation 436, it is determined that the cosine similarity meets the criteria or criterion discussed above, the flow 400 moves to operation 428 where such CVE_IDs are added to a list that aggregates these CVE_IDS for CVEs determined to be relevant in generating the attack graph. It is noted that that each platform record and product name record should contain a CVE_ID as a foreign key, as discussed above, and these foreign keys may be utilized to generate the list at operation 428.

Next, as shown in FIG. 4B, at operation 429, natural language CVE descriptions from the CVE_INFO table using the list of CVE_IDs are used to build context (e.g., external information or additional context that can steer the model to better responses). In some implementations, the CVE_IDs that were added to the list generated at operation 428 are concatenated with corresponding CVE descriptions to build the context. Next, at operation 430, a prompt (e.g., a query) for input to an LLM to generate an attack graph is built by including the context from operation 428 and other general instructions, such as how to chain the vulnerabilities provided in the context and what the output format should be.

At operation 431, the LLM is called (e.g., executed) using the prompt generated at operation 430 to generate an attack graph as a response. In some implementations this attack graph can be provided in the JSON format, although other formats are contemplated within the scope of the disclosure.

Next, at operation 432, the attack graph may be processed to, for example, show the attack graph visually (e.g., via a user interface), convert the attack graph to a Python object, etc. Then, at operation 433, the processed attack graph can be saved on permanent storage such as a hard disk, cloud storage, etc. In some implementations, the attack graph can be saved as a JSON file, or other suitable file format.

At operation 434, the flow 400 ends.

Figure 5:
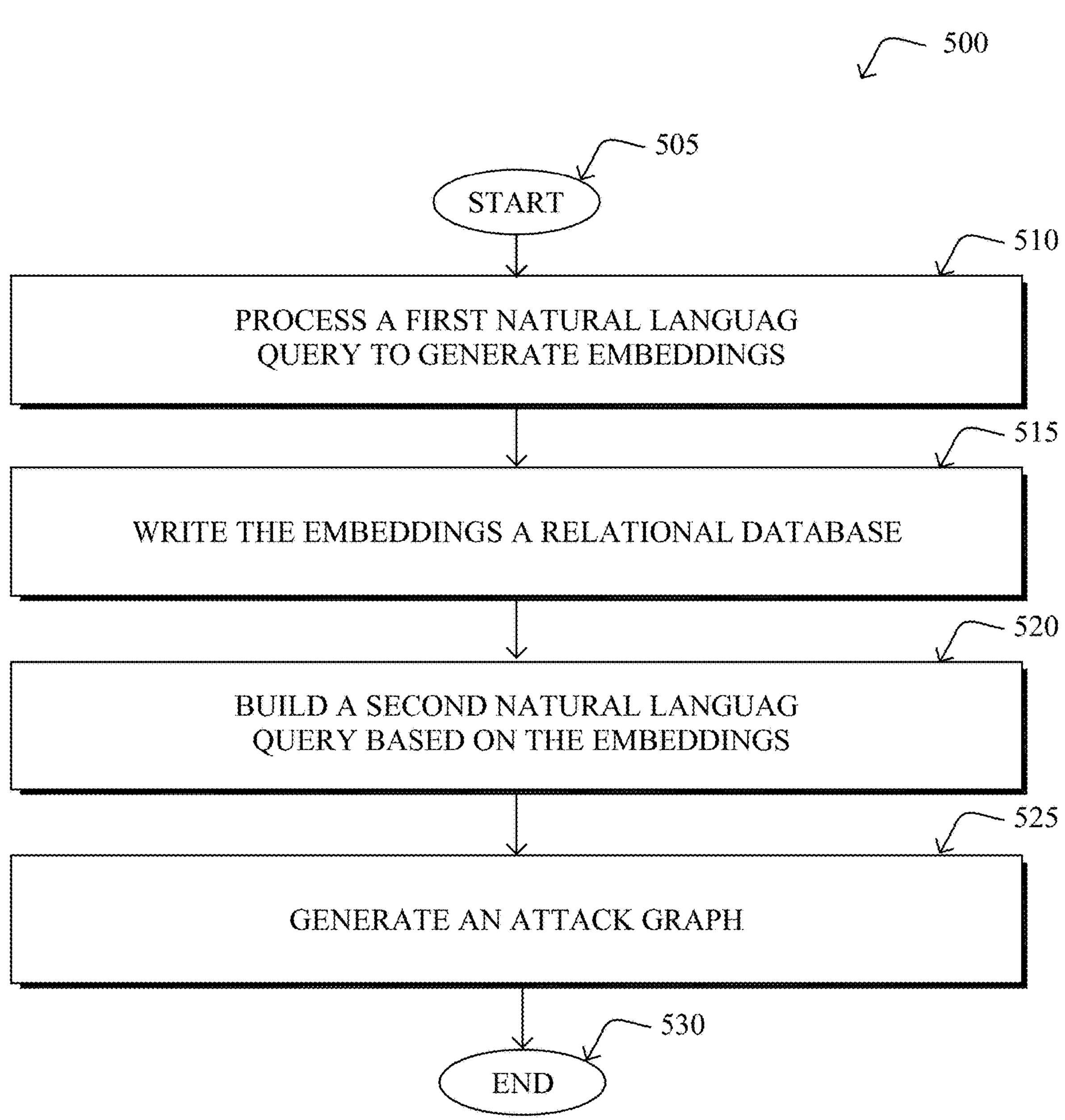
FIG. 5 illustrates an example procedure for the automatic construction of attack graphs using large language models in accordance with the disclosure.

FIG. 5 illustrates an example simplified procedure for automatic construction of attack graphs using large language models in accordance with one or more embodiments described herein. For example, a non-generic, specifically configured device (e.g., device 200, an apparatus) may perform procedure 500 by executing stored instructions (e.g., process 248). The procedure 500 may start at step 505, and continues to step 510, where, as described in greater detail above, a process executing a large language model processes a first natural language query to generate embeddings containing vulnerability information corresponding to a computing system. In some implementations, the vulnerability information includes common vulnerabilities and exposures information. Further, as mentioned above, in some implementations, the embeddings containing the vulnerability information and/or structured information including the embeddings, can be generated using a retriever model trained with contrastive learning.

The procedure 500 may continue to step 515 where, as described in greater detail above, the embeddings containing the vulnerability information and/or structured information including the embeddings are written to a datastore. In some implementations, the datastore is selected for a list consisting of a relational database, a NoSQL store, a vector database, and an in-memory storage, although examples are not so limited. In some implementations, the embeddings containing the vulnerability information and/or structured information including the embeddings are written to the datastore in a JSON format. As mentioned above, the embeddings containing vulnerability information and/or structured information including the embeddings can be written to a persistent memory device. Implementations are not so limited, however, and in some implementations, the embeddings containing vulnerability information and/or structured information including the embeddings can be written to a cloud storage location. Further in some implementations, the structured information is selected from a list consisting of a product name, a platform, and an affected version, among other possibilities.

The procedure 500 may continue to step 520 where, as described in greater detail above, the process builds a second natural language query based on the embeddings containing the vulnerability information.

The procedure 500 may continue to step 525 where, as described in greater detail above, an attack graph corresponding to the vulnerability information is generated by executing the second natural language query according to the datastore. In some implementations, the procedure 500 includes building, as part of generating the attack graph, a context for the second natural language query by concatenating relevant descriptions of components corresponding to the embeddings containing the vulnerability information. In addition, as discussed above, the procedure 500 can further include executing the second natural language query to extract and semantically match properties of the embeddings containing the vulnerability information to common vulnerabilities and exposures information associated with the computing system.

In some implementations, the procedure 500 includes calculating a cosine similarity between the embeddings containing the vulnerability information and embeddings corresponding to components of the computing system, determining that the cosine similarity meets a particular criterion, and adding components associated with the embeddings containing the vulnerability information to the attack graph when the cosine similarity meets the particular criterion. In such implementations, the cosine similarity can be inversely proportional to a length of the embeddings containing the vulnerability information.

In some implementations, the procedure 500 can include obtaining, using the large language model, one or more properties from description properties associated with a vulnerability information file, calculating the embeddings containing the vulnerability information based on the one or more properties from the description properties associated with the vulnerability information file, writing the embeddings containing the vulnerability information to a persistent storage, and building the second natural language query based on the embeddings containing the vulnerability information as discussed above in connection with FIG. 3.

Procedure 500 may end at step 530.

Figure 6:
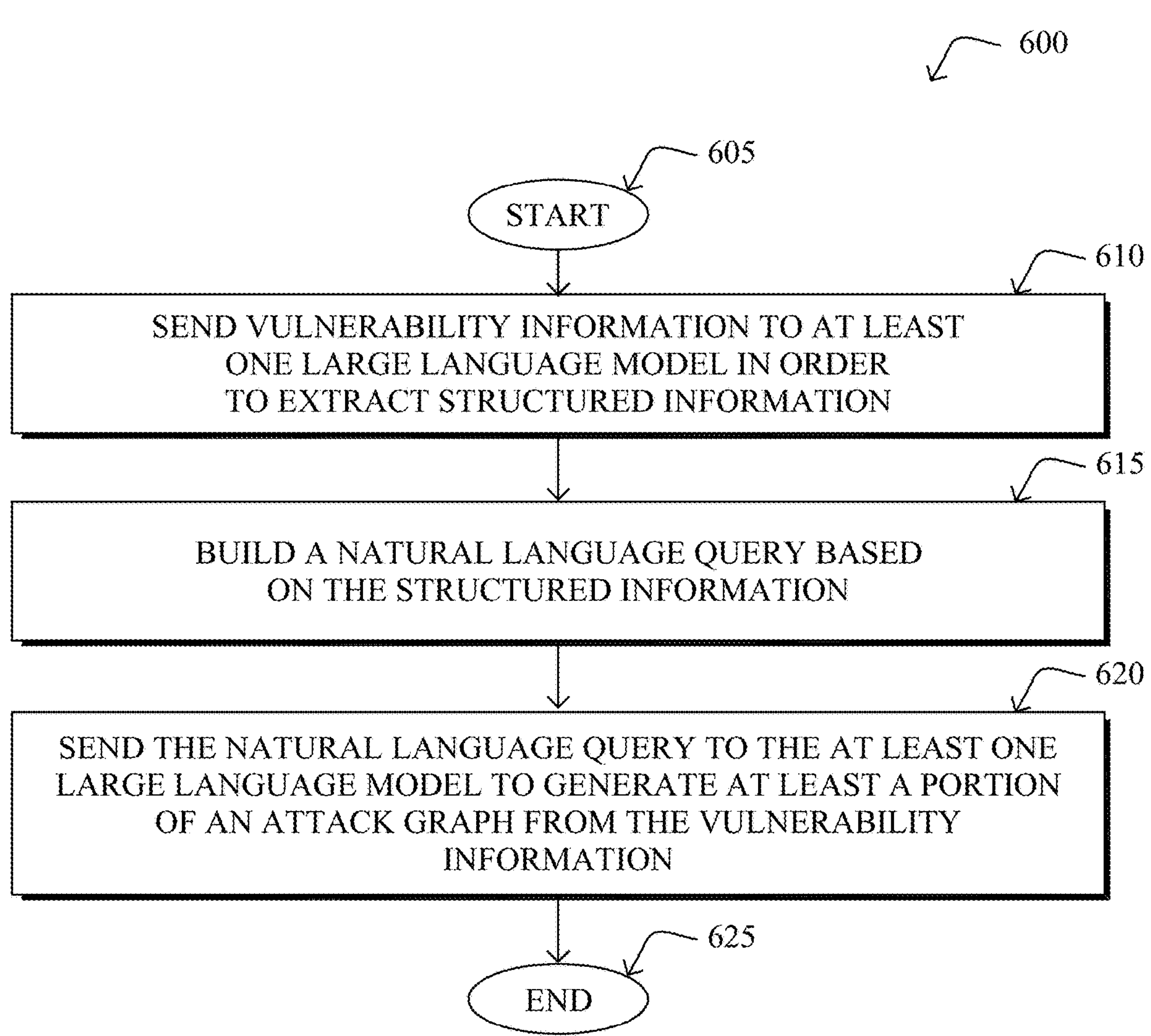
FIG. 6 illustrates an example simplified procedure for automatic construction of attack graphs using large language models in accordance with one or more embodiments described herein.

In closing, FIG. 6 illustrates an example simplified procedure for automatic construction of attack graphs using large language models in accordance with one or more embodiments described herein. For example, a non-generic, specifically configured device (e.g., device 200, an apparatus) may perform procedure 600 by executing stored instructions (e.g., process 248). The procedure 600 may start at step 605, and continues to step 610, where, as described in greater detail above, vulnerability information to at least one large language model in order to extract structured information may be sent by a computing system comprising one or more processors configured to execute one or more processes. As discussed above, the vulnerability information can comprise common vulnerabilities and exposures information.

The procedure 600 may continue to step 615 where, as described in greater detail above, a natural language query based on the structured information may be built by the computing system comprising the one or more processors configured to execute the one or more processes.

The procedure 600 may continue to step 620 where, as described in greater detail above, the natural language query to the at least one large language model to generate at least a portion of an attack graph from the vulnerability information may be sent by the computing system comprising the one or more processors configured to execute the one or more processes. In some implementations, the procedure 600 can include building, as part of generating the attack graph, a context for the natural language query by concatenating relevant descriptions of components corresponding to the vulnerability information.

In some implementations, the procedure 600 can further include sending, by the computing system comprising the one or more processors configured to execute the one or more processes, at least one additional natural language query in addition to the natural language query, to the at least one large language model to generate at least one subgraph associated with the attack graph from the vulnerability information and assembling the attack graph from a plurality of subgraphs provided by the at least one large language model.

In some implementations, the procedure 600 can include calculating a cosine similarity between the structured information and structured information corresponding to components of the computing system, determining that the cosine similarity meets a particular criterion, and adding components associated with the structured information containing the vulnerability information to the attack graph when the cosine similarity meets the particular criterion, wherein the cosine similarity is inversely proportional to a length of structured information.

As discussed above, in some implementations, the procedure 600 can further include obtaining, using the large language model, one or more properties from description properties associated with a vulnerability information file, calculating structured information based on the one or more properties from the description properties associated with the vulnerability information file, writing the structured information to a persistent storage, and building the natural language query based on the structured information.

In some implementations, the structured information can be written to a persistent memory device, a cloud storage location, or other suitable storage location. For example, the structured information can be written to a datastore, and the datastore can be selected from a list consisting of a relational database, a NoSQL store, a vector database, and/or an in-memory storage Further, as discussed herein, the structured information can be selected from a list consisting of a product name, a platform, and an affected version.

In some implementations, the structured information can be generated using a retriever model trained with contrastive learning, as discussed herein.

In some implementations, the natural language query can be executed to extract and semantically match properties of the structured information to common vulnerabilities and exposures information associated with the computing system.

Procedure 600 may end at step 625.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: sending, by a computing system comprising one or more processors configured to execute one or more processes, vulnerability information to at least one large language model in order to extract structured information and building, by the computing system comprising the one or more processors configured to execute the one or more processes, a natural language query based on the structured information. The method further comprises sending, by the computing system comprising the one or more processors configured to execute the one or more processes, the natural language query to the at least one large language model to generate at least a portion of an attack graph from the vulnerability information.

The data store can be a relational database such as SQLite, MySQL, SQL Server, DB2, etc. The data store could also be a NoSQL store, a file system, a vector database, as well as a variety of other storage options.

In still other implementations, a tangible, non-transitory, computer-readable medium storing program instructions that cause a device to execute a process comprising: sending, by a computing system comprising one or more processors configured to execute one or more processes, vulnerability information to at least one large language model in order to extract structured information and building, by the computing system comprising the one or more processors configured to execute the one or more processes, a natural language query based on the structured information. The method further comprises sending, by the computing system comprising the one or more processors configured to execute the one or more processes, the natural language query to the at least one large language model to generate at least a portion of an attack graph from the vulnerability information.

The techniques described herein, therefore, provide for automatic construction of attack graphs using large language models. That is, the techniques herein provide automated methods of analyzing security vulnerabilities and generating attack graphs using a combination of large language models and structured information (e.g., in a datastore, such as a relational databases) in order to generate up-to-date attack graphs that are scalable with the overall size of a computing system of which the attack graph represents. As mentioned above, in accordance with the disclosure, NLP techniques can be employed to handle extracting and semantically matching necessary properties from the natural language description of a CVE, while the datastore takes advantage of the structured part and stores different properties and associated metadata. These NLP techniques are implemented through the use of LLMs to generate up-to-date attack graphs that are scalable with the overall size of a computing system of which the attack graph represents.

Illustratively, the techniques described herein may be performed by hardware, software, and/or firmware, (e.g., an "apparatus") such as in accordance with the an attack graph generation process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

sending, by one or more processors, vulnerability information to at least one large language model in order to extract structured information;

determining a similarity between a first embedding representing the structured information and a second embedding representing information regarding one or more components of a computing system;

determining that the similarity meets one or more criteria;

building, by the one or more processors, a natural language query based on at least a portion of the structured information and the information regarding the one or more components of the computing system; and sending, by the one or more processors, the natural language query to the at least one large language model to generate at least a portion of an attack graph related to the computing system.

2. The method of claim 1, wherein the vulnerability information comprises common vulnerabilities and exposures information.

3. The method of claim 1, further comprising:
sending, by the one or more processors, at least one additional natural language query in addition to the natural language query, to the at least one large language model to generate at least one subgraph associated with the attack graph; and
assembling the attack graph from a plurality of subgraphs provided by the at least one large language model.

4. The method of claim 1, further comprising:
building, as part of generating the attack graph, a context for the natural language query by concatenating relevant descriptions of components corresponding to the vulnerability information.

5. The method of claim 1, wherein the determining the similarity between the first embedding and the second embedding includes calculating a cosine similarity between the first embedding and the second embedding,
wherein the cosine similarity is inversely proportional to a length of structured information.

6. The method of claim 1, further comprising:
obtaining, using the at least one large language model, one or more properties from description properties associated with a vulnerability information file;
calculating structured information based on the one or more properties from the description properties associated with the vulnerability information file;
writing the structured information to a persistent storage; and
building the natural language query based on the structured information.

7. The method of claim 1, further comprising:
writing the structured information to a persistent memory device, or
writing the structured information to a cloud storage location.

8. The method of claim 1, wherein the structured information is selected from a list consisting of a product name, a platform, and an affected version.

9. The method of claim 1, wherein the structured information is written to a datastore, and wherein the datastore is selected from a list consisting of a relational database, a NoSQL store, a vector database, and an in-memory storage.

10. The method of claim 1, further comprising:
generating the structured information using a retriever model trained with contrastive learning.

11. The method of claim 1, further comprising:
executing the natural language query to extract and semantically match properties of the structured information to common vulnerabilities and exposures information associated with the computing system.

12. An apparatus, comprising:
one or more network interfaces to communicate with a network;
a processor coupled to the one or more network interfaces; and
a memory configured to store one or more instructions that, when executed by the processor, cause the processor to perform operations comprising:
sending vulnerability information to at least one large language model in order to extract structured information;
determining a similarity between a first embedding representing the structured information and a second embedding representing information regarding one or more components of a computing system;
determining that the similarity meets one or more criteria;
building a natural language query based on at least a portion of the structured information and the information regarding the one or more components of the computing system; and
sending the natural language query to the at least one large language model to generate at least a portion of an attack graph.

13. The apparatus of claim 12, wherein the vulnerability information comprises common vulnerabilities and exposures information.

14. The apparatus of claim 12, wherein the operations further comprise:
building, as part of generating the attack graph, a context for the natural language query by concatenating relevant descriptions of components corresponding to the structured information.

15. The apparatus of claim 12, wherein the determining the similarity between the first embedding and the second embedding includes calculating a cosine similarity between the first embedding and the second embedding.

16. The apparatus of claim 15, wherein the cosine similarity is inversely proportional to a length of the structured information containing the vulnerability information.

17. The apparatus of claim 12, wherein the operations further comprise:
writing the structured information to a persistent memory device, or writing the structured information to a cloud storage location.

18. The apparatus of claim 12, wherein the operations further comprise:
generating the structured information using a retriever model trained with contrastive learning.

19. The apparatus of claim 12, wherein the operations further comprise:
executing the natural language query to extract and semantically match properties of the structured information to common vulnerabilities and exposures information associated with the computing system.

20. A tangible, non-transitory, computer-readable medium storing program instructions that cause a device to execute a process comprising:
sending vulnerability information to at least one large language model in order to extract structured information;
determining a similarity between a first embedding representing the structured information and a second embedding representing information regarding one or more components of a computing system;
determining that the similarity meets one or more criteria;
building a natural language query based on at least a portion of the structured information and the information regarding the one or more components of the computing system; and
sending the natural language query to the at least one large language model or another large language model to generate at least a portion of an attack graph.

* * * * *